Feb. 2, 1954        O. C. BREWSTER        2,667,886

FLUID PRESSURE TRANSMITTER

Filed Dec. 19, 1946        2 Sheets—Sheet 1

INVENTOR
OSWALD C. BREWSTER
BY
ATTORNEYS

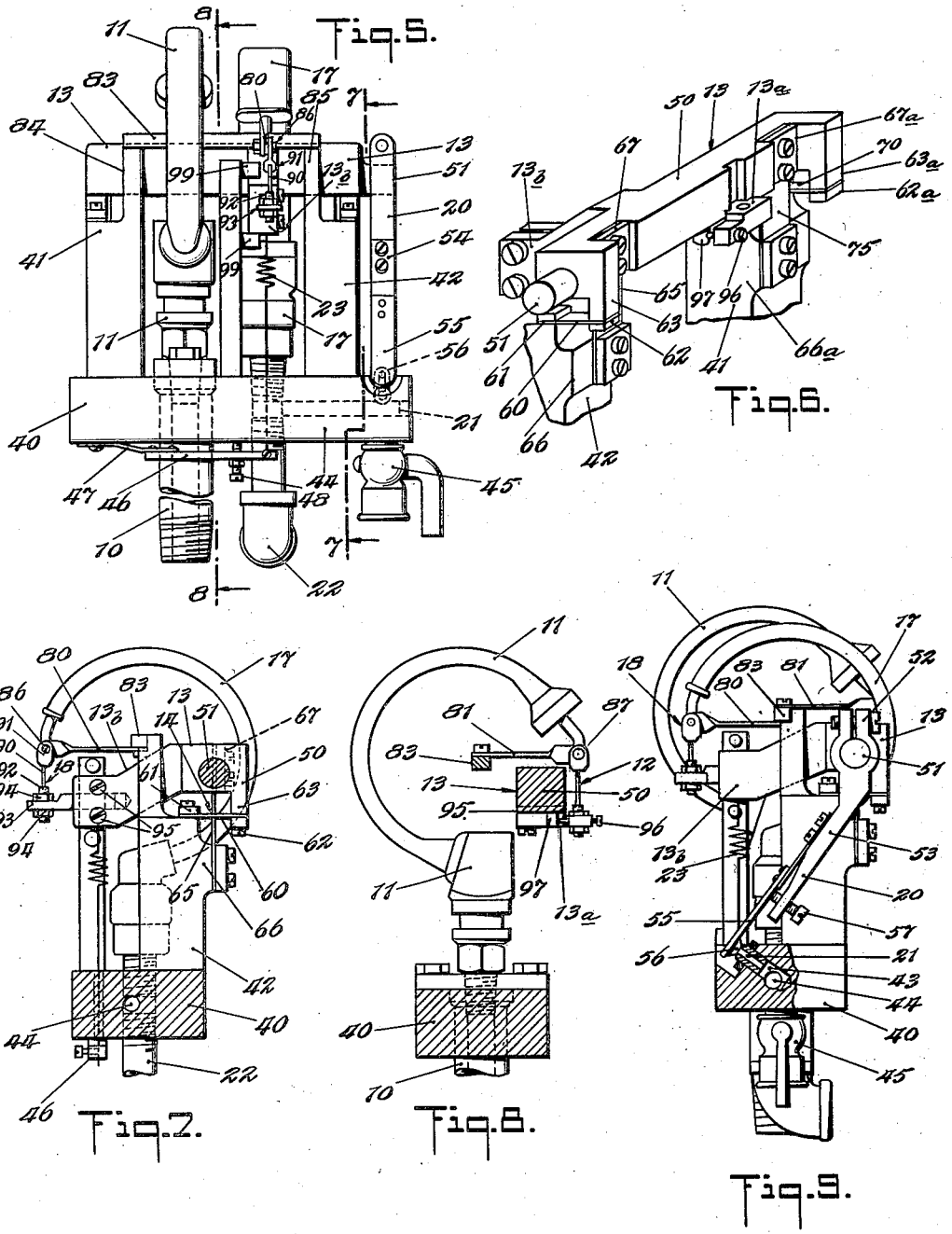

Patented Feb. 2, 1954

2,667,886

UNITED STATES PATENT OFFICE 2,667,886

FLUID PRESSURE TRANSMITTER

Oswald C. Brewster, Litchfield, Conn.

Application December 19, 1946, Serial No. 717,155

1 Claim. (Cl. 137—84)

This invention has to do with a fluid pressure transmitter of the force-balance type. Such an instrument is designed to transmit to a distant point, with or without intermediate relays or amplifiers, a fluid pressure which is usually pneumatic and which is accurately proportional to a primary pressure, existing in another fluid, to which it is desired to secure a response at the distant point. The responsive mechanism located at the distant point and actuated by the transmitted pressure may be an indicator or a recorder or a controller of the primary pressure, or a device which operates or controls a further mechanism in response to changes in the primary pressure.

The general field of use for such an instrument is where it is impracticable or undesirable to transmit to the distant point the particular fluid in which the primary pressure exists, because of the composition, temperature, pressure or other characteristic of that fluid.

The primary pressure may be that of a flow line or a pressure vessel; it may be the difference between two pressures in one or more flow lines or vessels; or it may be a pressure which in turn reflects another pressure, a flow, a temperature or some other condition that is translated into a proportional pressure to which the instrument primarily responds.

The general principle employed is that known as force-balance, according to which, instead of using the primary fluid as the transmitting medium, an automatic instrument establishes in a different medium a pressure which is proportional to the primary pressure, and this different medium extending to the distant point applies its pressure there. In known instruments the proportionality of the transmitted pressure is automatically maintained, as the primary pressure varies, by setting the primary pressure in opposition to the pressure of the transmitting medium, usually through a system of differential levers actuated by pistons, bellows or diaphragms on which the fluid pressures are imposed, and then automatically regulating the pressure of the transmitting medium to maintain a balance of the opposed lever forces or turning moments generated by these pressures. When it balances the primary pressure, the pressure of the transmitting medium is necessarily proportional to the primary pressure. Proportionality here includes equality as one possible condition.

In common use as a pressure regulating means in such instruments is a baffled leak nozzle system, sometimes called a flapper valve, which maintains the pressure of the transmitting fluid at a balancing level by controlling the leakage of the continuously supplied transmitting fluid in response to changes in the primary pressure. The baffle or flapper is moved toward or away from the leakage outlet, varying the leakage, in accordance with changes in the primary pressure, usually by being connected directly to the rocking element which is subject to the opposed forces and is rocked when those forces are out of balance.

The controlled leakage is at a point downstream from a restriction in the supply line for the transmitting fluid, and the fluid used in opposing the primary pressure is taken from a point between the restriction and the leakage outlet so that its pressure depends on the rate of leakage and is usually controlled between a value close to zero at maximum leakage and close to the supply pressure at minimum leakage. The output line leading to the distant point is likewise connected to a point between the choke and the leakage outlet, so that the transmitted pressure at the output is the balancing pressure. I prefer to use this means of regulating the balancing force in instruments embodying the present invention, but other means may be used if one wishes.

The aim of this invention is to simplify such pressure transmitting instruments without loss of sensitivity, smoothness and accuracy of operation and with even some gain in these respects; to provide a rugged instrument, more compact and less costly than those now known; and to provide a flexible basic combination capable of embodiment in a series of instruments designed for a variety of practical situations.

The basic idea is to lower the level of the forces which are opposed in such an instrument. In known instruments in which the fluid pressures are imposed on diaphragms, which in turn act upon opposite sides of a rocking beam so as to oppose each other, the force applied to the beam by the primary pressure may be of the order of several hundred pounds or several thousand pounds, requiring a very heavy and strong beam and a bearing at the pivot capable of withstanding forces of that order; and on the balancing or transmitting pressure side the lever arm has to be long in order to create a balancing moment with the relatively low pressure at which it is desirable to have the transmitting fluid. Other disadvantages are introduced in dealing with differential pressures on the primary side, especially when the beam enters the high pressure zone and has to be sealed at the joint.

I greatly reduce the level of the forces involved, and attain the object set forth above, by using a Bourdon tube in what I believe to be a novel way, and in what in any event is a way not before applied to such a problem as this. I restrain the Bourdon tube from all but extremely limited and almost imperceptible motion, and use it to exert a force, instead of using it as usual to produce largely unrestricted motion. At least the higher of the fluid pressures is imposed on a Bourdon tube which is thus restrained from any but extremely limited motion, and a force exerted by its outer portion in this restrained condition is set in opposition to the other force involved, which may be the output force of another restrained Bourdon tube or may be a force otherwise generated.

The facts which give this its utility are that the output force of a restrained Bourdon tube is very low in proportion to the imposed fluid pressure, and that its output force is accurately proportional to the imposed fluid pressure.

For example, the output force of a restrained Bourdon tube subjected to an internal fluid pressure of 500 pounds may be as low as four or five pounds (or something more or less, but of that order, depending on the materials and design of the Bourdon tube); and over the entire range of a tube of this rating the output force exerted by the tip when restrained shows a straight line relationship to the imposed pressure. Similarly for an internal fluid pressure of 5,000 pounds, the output force of the tip of a certain type of Bourdon tube in general commercial use in a conventional pressure gauge, when restrained from its normal outward motion is only about 40 to 60 pounds; and tubes rated for such a fluid pressure show similarly a straight line relation of output force to imposed fluid pressure. The same holds true for Bourdon tubes designed for internal fluid pressures of but a few pounds or a fraction of a pound or subatmospheric pressures.

The transmitting fluid is usually supplied at a pressure on the order of 15 to 30 pounds per square inch, gauge, in order to simplify the supply and transmission problems. After allowing for the effect of the leakage, the pressure available to develop the balancing force is something less than that supply pressure. The frequent disparity between this pressure and the primary pressure is what makes it necessary in known instruments to rely upon long lever arms to develop a sufficient force to create a balance, since the balance has to be obtained at the level of the higher of the pressures involved. Lowering the force level through use of a restrained Bourdon on at least the higher pressure side greatly reduces this disparity, both when the primary pressure is the higher one and when the transmitting fluid pressure is the higher. A beam and bearing structure, or other intermediary structure through which these forces are opposed to one another, can be much lighter, smaller and more compact for any given pressure when it has to withstand only forces of this diminished order and the whole problem of instrument design and construction is altered in character.

Instruments employing a restrained Bourdon tube pursuant to this invention may have different means through which the primary force and the balancing force are opposed to each other. Past practice in instruments employing bellows or diaphragms has generally been to get this opposition through some form of rocking beam, such as a pivoted lever with a ball or roller bearing. This rocking element is usually arranged to move the leakage baffle directly or indirectly. Such a rocking element may also be employed in an instrument embodying the present invention.

The present invention therefore is not limited in respect to the character of the structure by which the forces are put in opposition or by which they are kept in balance; and likewise when a Bourdon tube is used on the primary side, the invention is not limited as to the character of the means by which the balancing force is created and controlled. For example, a restrained Bourdon tube on which the primary pressure is imposed may be connected at its outer part to the baffle of a leakage nozzle system employing the invention of my co-pending application Serial Number 717,156, filed herewith, now Patent No. 2,588,800 of March 11, 1952, and entitled Automatic Force Balance Mechanism, according to which a balancing force proportional to the primary pressure is obtained from the pressure of the leakage fluid upon the baffle, and the intermediate linkage is simplified.

For transmitting a force proportional to a differential primary pressure, one may subject separate restrained Bourdon tubes respectively to the high and the low primary pressures. Especially where the primary pressures are higher than the pressure of the transmitting fluid, this gains the advantage of the lowered force level just as with a single primary pressure. The output forces of the two primary Bourdon tubes in such case are put in opposition to each other, as for example by connecting them to a rocking beam on opposite sides of its pivotal axis; and the balancing force derived from the transmitting fluid is opposed to the resultant or differential of these output forces. As in the case of a single primary pressure, the balancing force may be the output force of another Bourdon tube subjected to the transmitting fluid pressure, or it may be obtained otherwise, as by the action of the leakage fluid upon the baffle in accordance with the invention of my copending application identified above. In any case, the reduced level of the forces derived from the primary pressures makes it possible to employ a lighter structure; and where the pressure differential is large, it effects such a diminishment of the differential force as to enable one to balance it without employing a long lever arm.

Such a differential pressure transmitter has the further advantage of eliminating the hazard that attends the known use of a diaphragm subjected on opposite sides to the high and the low primary pressures. If either pressure is lost, an excessive unbalanced force is imposed on such a diaphragm. With the opposed Bourdon tubes, separately subjected to the primary pressures, no harm is done if either pressure is not applied to its tube. Further, because the tubes contain their respective fluids, there is no need to lead the rocking beam into the pressure zone, with the attendant problem of sealing the bearing, as in certain known diaphragm instruments.

Mention has been made of the fact that the basic idea here is to use a restrained Bourdon tube on at least the side of higher pressure, that is to say, on the primary pressure side when the primary pressure or pressures are greater than the transmitting fluid pressure, or on the balancing side when the transmitting fluid pressure exceeds the primary fluid pressure or pressures. It has also been stated that restrained Bourdon tubes may be used on both sides of such a force-balance system. There are certain conditions however under which it is preferable to use the Bourdon tube only on the higher pressure side, and to use on the other or lower pressure side some means for amplifying the initial force derived from the lower pressure fluid to create an applied force of the order of the output force of the Bourdon tube or tubes.

This situation arises when there would be a substantial disparity between the output forces if Bourbon tubes were used on both sides of the system. For example, with a primary pressure of 5000 p. s. i. g., the output force of a restrained Bourdon tube may be on the order of 50 pounds. With the transmitting fluid pressure desirably on the order of 15 to 30 pounds, and therefore less than the force to be balanced, it is necessary to derive an amplified rather than a diminished force from the transmitting fluid, so it is not desirable in such case to impose that pressure upon a Bourdon tube. I use either a bellows or diaphragm, of such area as to give an output force of the order of the primary force (e. g. 50 pounds) or preferably I employ the invention of my co-pending application referred to above which is capable of being designed to give any desired balancing force over a wide range.

Similarly, when dealing with very low primary pressures, as for example the pressures of the order of a few inches of water encountered in gas work, the force diminishment effected by the Bourdon tube would not be of advantage on the primary side. In such cases, I use a bellows or diaphragm on that side and may use a restrained Bourdon tube on the balancing side to lower the level of the forces put in opposition to obtain the balance.

There is no sharp line dividing the fields in which it is preferable or not to use the Bourdon tube on both sides, primary and balancing, since an element of individual preference enters; but generally speaking my preference is to use the Bourdon tube means on both sides with primary pressures from two or three pounds up to 1000 pounds, and only on the higher pressure side for primary pressures below or above this range; with only the exception created by my further invention which makes it possible to do without a separate fluid pressure element on the balancing side by getting the balancing force from the pressure of the leakage fluid on the baffle of the pressure control means. When using that further improvement, I use the Bourdon tube only on the primary side and for all primary pressures except the very lowest, any diminishment of which would reduce the force level below even that which it is practicable to obtain with the leakage nozzle balancing means.

The invention also provides an improved frictionless bearing or pivot for a rocking element through which forces may be put in opposition. This gives increased sensitivity and smoothness of operation combined with great ruggedness and freedom from any need for housing, cleaning or lubrication. This is a feature of especial importance in an instrument in which the opposed forces acting on the beam or the spindle which rocks on this bearing are of the low order of magnitude made possible by the use of at least a restraining Bourdon tube on the higher pressure side.

Further inventive features include two different means for coping with a problem that arises under some conditions by reason of the inherent spring characteristic of the Bourdon tube or of any other spring type of fluid pressure element such as a metallic bellows. These include an improved form of booster or amplifier of the effect of a minute movement of the leakage baffle, thereby to minimize the effect of the spring characteristic, and an alternative device which neutralizes or compensates for the effect of the spring characteristic in whole or in part. I show a similar spring compensator in my co-pending application Serial Number 709,115, filed November 12, 1946, now abandoned. In a further improved form of instrument, the invention includes a combination of the frictionless bearing with a compensator for the spring characteristic of the fluid pressure elements, in which one of the spring elements serves both as a part of the bearing and as a part of the compensator.

The annexed drawings show in schematic form, with one form in full construction detail, illustrative embodiments of the invention which are described in the following. In the drawings:

Fig. 5 is an end elevation of a complete instrument of the type schematically shown in Fig. 1;

Fig. 6 is a perspective view of the rocking element and frictionless bearing of the instrument shown in Fig. 5;

Figs. 7 and 8 are side elevations, partly in section, on the lines 7 and 8 respectively of Fig. 5;

Fig. 9 is a side elevation of the same, showing further details of construction.

Figure 4:
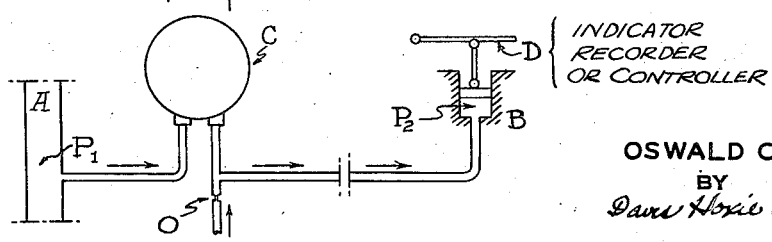
Fig. 4 is a schematic diagram of a force-balance fluid system to show generically the use of a fluid pressure transmitter.

The diagram which is Fig. 4 shows generically the use of a pressure transmitter instrument in an indicating or controlling system, illustrating the use of a transmitter without showing any particular construction of the transmitter itself. Assume that the desideratum is to indicate (or to record or to control) at a remote location B the pressure $P_1$ of the zone A, notwithstanding the fact that it is not feasible to convey the pressure fluid of zone A to the remote point B to permit it to actuate an indicating or other instrument located there. The pressure transmitter instrument C is therefore located near zone A. In the instrument, through some intermediary means, the pressure $P_1$ is opposed by the pressure of a continuously introduced low pressure fluid, usually air at a pressure on the order of 15 to 30 pounds. An automatic mechanism maintains the pressure of the air as it is imposed on the intermediary system at a value $P_2$ which exerts a force that just balances the force exerted by the pressure $P_1$. In that balanced condition, the air pressure $P_2$ is accurately proportional to the pressure $P_1$; and when transmitted to the point B by the air or other medium it gives a faithful reflection of the primary pressure. It may be used, as indicated generically by the piston and lever arm D, to operate an indicator, a recorder or a controller of the primary pressure $P_1$, or to operate or control some other device whose operation is to be made responsive to the primary pressure.

Figure 1:
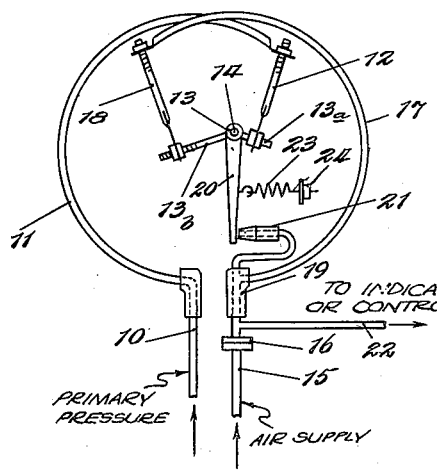
Fig. 1 shows schematically an instrument responsive to a single primary pressure and employing a Bourdon tube both on the primary pressure side and on the balancing pressure side.
Figure 2:
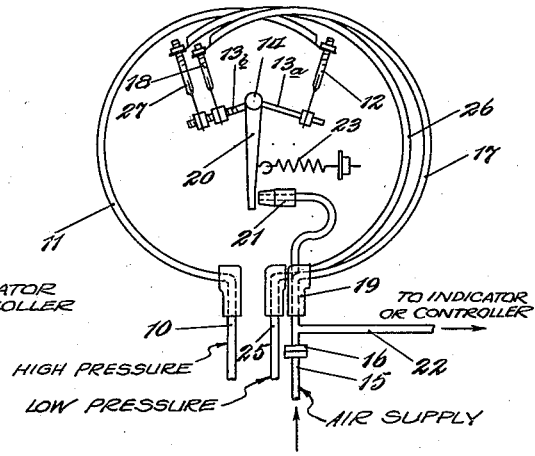
Fig. 2 shows similarly an instrument responsive to a differential pressure and using Bourdon tubes throughout.
Figure 3:
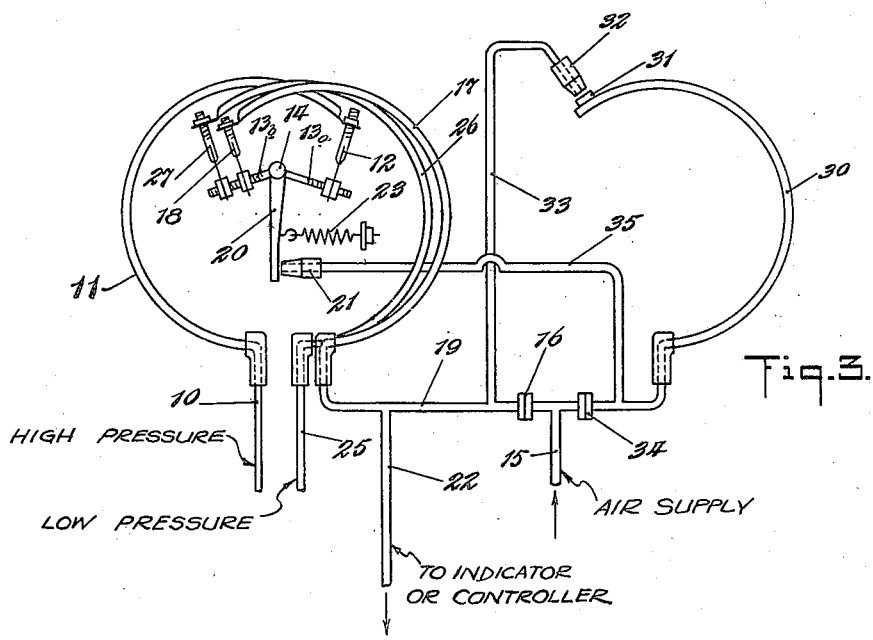
Fig. 3 shows an instrument like that of Fig. 2 but supplemented by the booster or amplifying means.

Figs. 1, 2 and 3 show, schematically, different arrangements of such a pressure transmitter in which the novel characteristic is that restrained Bourdon tubes are used as actuating elements on which the primary pressure and the transmitted pressure are imposed to develop opposing low-level forces that are automatically kept in balance by a conventional leakage nozzle means.

In Fig. 1, the primary pressure fluid is delivered by line 10 to a Bourdon tube 11, the tip of which is connected by a linkage 12 to one side 13$^a$ of a beam 13 which rocks about the axis 14. Instrument air is supplied by line 15, containing a restricted orifice plate 16, and is delivered to a second Bourdon tube 17 similarly connected by linkage 18 to the other side 13$^b$ of the rocking beam 13.

The linkages 12 and 18 are connected to the beam 13 at such different distances from the axis 14 as to give approximately equal and opposite turning moments despite the difference in the fluid pressures imposed on the Bourdon tubes. Thus, linkage 18 is connected at a more distant point giving a longer lever arm through which to apply the output force of the transmitter tube 17, illustrating a system in which the primary pressure is greater than the instrument air pressure.

As shown here, the lever arms 13$^a$ and 13$^b$ are so placed angularly that the links 12 and 18 connecting them to the tips of the Bourdon tubes are substantially normal to the lever arms and lie along lines tangent to the arcs over which the tips of the tubes would travel if not restrained. This lets the full output force of the tube be applied to the rocking beam. A preferred arrangement described below (see Figs. 5–9) is one in which a horizontal tie holds the tip of the tube against lateral movement and the link to the rocking beam is vertical, so that only the vertical component of the output force of the tube is applied to the beam. (These directions are described as vertical and horizontal in a relative sense, taking the tube to be standing upright as shown.) With or without such a tie, motion of the tube is restrained except to the minute extent involved in moving the baffle over its operating range, usually a very few thousandths of an inch. In speaking below of the output force of a Bourdon tube, I mean either the total force exerted by the tip or other outboard part of the tube, or a particular component of that total force.

An arm 20 mounted on the same axis, and rocking with the beam 13, is the baffle for a leakage nozzle 21 which is connected to the air line in the region 19 beyond the choke 16. The output line 22 leading to the secondarily responsive instrument (e. g., B in Fig. 4) is similarly connected to the air system in the region 19 beyond the choke and back of the leakage outlet. It therefore delivers air at whatever pressure, less than that of the supply, is imposed on the transmitter or balancing tube 17. The value of that pressure is determined by the position of the baffle with respect to the nozzle outlet, and by the resulting rate of leakage. The position of the baffle is fixed in turn by the position of the rocking element under the influence of the opposing forces tending to rock it about its axis 14.

The pressures applied to the bourdon tubes cause them to tend to swing outward at their tips. In conventional usage, such a tube is free to swing and its motion is utilized to move a pointer or a regulating device, which utilizes force only to produce such motion. Good design in such an instrument (e. g., a gauge or regulator) calls for facilitating that motion and for avoidance of any material restraint upon the tube. Here, because the two Bourdon tubes are connected to a beam on opposite sides of its axis of rotation, each opposes the other and restrains it from free movement. Their predominant action therefore is to exert opposing forces on the rocking beam. Rocking motion of the beam results if the turning moments of these opposing Bourdon tube forces are unequal, but it is extremely small because a correcting change in the transmitted air pressure is immediately brought about by the resulting change in the baffle position. The result is that there is practically no perceptible motion, and the two restrained tubes buck each other in an almost static condition.

Thus, if the turning moment of the primary pressure tube 11 exceeds that of the balancing tube 17 as the result of an increase in the primary pressure, the baffle 20 is at once moved closer to the nozzle with reduction of its leakage and consequent increase of pressure in the transmitter air system beyond the choke 16. Pressure promptly builds up between the choke and the nozzle until the balancing tube 17 exerts an equal turning moment. This of course opens the baffle and reduces the air pressure; but the system tends to come into equilibrium and produces an output pressure in line 22 proportional to the new primary pressure in line 10. The response is so rapid that under normal conditions the balance is maintained without perceptible motion of the beam. The extreme motion of the baffle may be of the order of a very few thousandths of an inch; for example, it is 0.0025 inch in one model of the instrument. The angular motion of the rocking beam 13 is of a similar order. For example, if the baffle arm is 3 inches long, with a maximum amplitude of 0.0025 inch at the nozzle, the angular motion is around 0.05 degree. It is evident therefore that the tip of the restrained Bourdon tube has an extremely limited motion.

A biasing spring 23 connected from a fixed point 24 to the baffle arm, or to another arm of the rocking beam 13, creates a constant turning moment of relatively low order tending to hold the baffle closed. Hence a certain minimum air pressure (e. g., 3 p. s. i. g.) in the balancing tube 17 is necessary to oppose this force and to open the baffle to the extent giving a balance at the minimum primary pressure. Thus, if the transmitted pressure is operating an indicating instrument, the movable indicator element would be brought to its zero upon application of the minimum air pressure needed to overcome the spring 23 and to open the baffle to the degree corresponding to the minimum primary pressure, which generally is zero, except in the case of so-called "range suppression." For each primary pressure value higher than that minimum, the baffle assumes a new position giving a balancing air pressure above the selected minimum. If the maximum output air pressure is fixed at 23 pounds, with the spring 23 set to require a minimum of 3 pounds, then the transmitter is designed so that the full range of primary pressure variation to be indicated is balanced by air pressures from 3 to 23 pounds; and the indicating instrument is one which responds to a full range of 20 pounds and is calibrated in terms of the primary pressure at the rate of 1/20 of the primary range for each 1 pound change in air pressure above the 3 pounds minimum. Preferred practice is to supply air at a higher pressure than the maximum output pressure at full range, to avoid any complete closing of the leakage outlet during operation.

An instrument designed to transmit a differential pressure is illustrated schematically in Figure 2. There the higher primary pressure of line 10 is imposed on one Bourdon tube 11, as before, and the output force of the tube is applied to one side of the rocking beam 13 through linkage 12. The lower primary pressure is imposed through line 25 on another Bourdon tube 26 connected by linkage 27 to the other side 13b of the beam, to which also the balancing tube 17 is connected by linkage 18 as before. The supply of transmitting fluid, and the connections of the nozzle 21 and the transmitter tube 17 to it, are as before.

Thus the two primary pressures are in opposition, and the air pressure acts in addition to the lower primary pressure to produce a balance of forces on the beam. The baffled leakage acts as before to maintain the balance against changes in either of the primary pressures which cause a change in the differential pressure, and the transmitted pressure at 22 is kept proportional to the differential primary pressure.

As compared with a known differential pressure transmitter employing a diaphragm subjected on opposite sides to the two primary pressures, with a rocking beam extending into the pressure zone so as to require a special seal at the bearing, this new differential pressure transmitter has the advantage of presenting no hazard if one of the primary pressures is lost or sharply reduced, and it requires no seal at the bearing since the pressure fluids are contained in the Bourdon tubes. In addition it has the same advantages as the single pressure form of Figure 1 in consequence of the low level of forces involved.

Figure 3 shows the Figure 2 type of differential pressure transmitter with a supplemental booster or amplifier of the effect of a minute movement of the baffle. This booster minimizes the error which, under some conditions, would be introduced by the effect of the spring characteristics of the Bourdon tubes. The spring characteristic of a Bourdon tube is such that when the tube is subjected to a fluid pressure tending to expand it, it exerts an inherent opposing force tending to restore it to a condition of repose, and this spring force varies according to the spring rate expressed in pounds per inch of motion of the tube. High pressure tubes have a high spring rate. Thus, even with baffle motion of the order of 0.002 inch for the full range of, say, 3 to 23 p. s. i. g. in the transmitting fluid, the effect of the motion of the tubes incident to the baffle motion may become material in terms of the change in their output forces.

For example, where the differential primary pressures are of the order of 1000 and 990 pounds, and a differential of 10 pounds is to be maintained, the spring rate of the tubes may be on the order of 450 pounds per inch. If the output force of a tube at 1000 pounds pressure is 60 pounds, as may be with tubes of one of the commercially available types, the change in output force caused by the full range of the 10 pounds differential in fluid pressure is 0.6 pound. The instrument must therefore be sensitive to a change in output force of 0.6 pound and less. However, with a baffle movement of 0.002 inch for this full range of pressure variation, and with a baffle arm twice as long as the tube lever arm, the full range motion of each primary tube is 0.001 inch, one primary tube expanding and the other relaxing by that amount. Such motion, with a spring rate of 450 pounds per inch, would cause a change of 0.45 pound in the effect of the spring characteristic of each tube, or a total change of 0.9 pound. In relation to the 0.6 pound variation due to primary pressure change, that variation due to spring rate introduces too great an error.

Another situation which makes the spring characteristic of the Bourdon tube significant is that arising when the pressure of the air supply at 15 varies. In effect that changes the pressure range for any given baffle movement, and in adjusting to it the Bourdon tubes may move by an amount which becomes material when their spring rate is high and the variation in primary pressure to be responded to is small.

I provide two different ways of making this possible source of error negligible, so that the restrained Bourdon tube transmitter may be used under all conditions. These are alternatives to the obvious but undesirable expedient of lengthening the baffle arm so that the motion of he tubes for a motion of, say, 0.002 inch at the baffle tip is negligible in terms of its effect on the spring force of the tubes.

The first way is to amplify the effect of a very small motion of the baffle, i. e., of motion over a small fraction of its full range, so that the correcting change in balancing pressure occurs before any significant motion of the tube has occurred. I do this by adding an unrestrained Bourdon tube, subjecting it to the pressure of the air at the primary baffled leak 20—21, and employing this unrestrained tube to baffle the leakage of the air supplied to the transmitter tube 17. Minute movement of the primary baffle 20 is reflected at once in amplified motion of the added Bourdon tube because the latter is not restrained, thus getting an amplified change in the air pressure imposed on the transmitter tube. In consequence, the primary baffle 20 has no occasion to move over any but a small fraction of its range, and the primary Bourdon tubes undergo a similarly limited motion insufficient to introduce any material change in output force in virtue of their spring characteristics.

The amplifier (Fig. 3) consists of a Bourdon tube 30 unrestrained at its tip and carrying there a baffle 31 for a second leakage nozzle 32 connected to receive air through line 33 from the supply line 15 in the region 19 beyond the choke 16 in the line leading to the balancing tube 17. Thus it is this added baffle 31 which directly controls the air pressure imposed on the balancing tube 17. The amplifier tube 30 receives air from the supply line at a point beyond a second choke 34; and the nozzle 21 controlled by the rocking beam baffle 20 is connected by line 35 to the inlet of the amplifier tube 30, beyond the choke 34. The primary baffle 20 therefore controls in the first instance the pressure of the air in the amplifier tube 30, and through the action of the latter it controls indirectly an amplified response in the pressure on the balancing tube 17.

The complete apparatus unit shown in Figs. 5–9 is of the type of Figure 1. The principal parts shown schematically in Fig. 1 are designated by the same reference characters, so that identification of these parts at the outset will facilitate an understanding of the whole structure. In it is also incorporated the improved frictionless bearing or pivot construction which is of especial advantage in combination with a Bourdon tube unit with its low level of output force.

A base 40 (shown in Figs. 5, 7, 8 and 9) serves as a mount for the two Bourdon tubes 11, 17 and for the two upright posts 41, 42 which support the rocking beam 13. The base 40 also contains the leakage nozzle 21, flow from which is controlled by the baffle 20 mounted on the rocking beam 13. Primary pressure line 10 leads into the base where it communicates with the tap which receives the primary pressure tube 11. Output line 22 likewise leads into the base and communicates there with the balancing tube 17. The leakage nozzle 20 is located in a diagonal bore 43 in the base. A transverse bore 44 connects this nozzle bore with the tap leading to the balancing tube 17, and a valved air inlet 45 containing the restricting orifice or choke 16 communicates with these interior air passages 43, 44 (corresponding to region 19 in the schematic diagrams) so that the air pressure at the balancing tube and at the output is dependent on the rate of leakage at the baffled nozzle 21.

The biasing spring 23 connects the lever arm 13b of the rocking beam 13 with an adjusting arm 46 which is connected by a spring hinge 47 to the underside of the base and is adjustable by means of a nut 48 to fix the biasing spring tension.

Two features of construction appear in this complete unit that are not indicated in the schematic figures, viz., (1) the special bearing or pivot for mounting the lever beam 13 on the posts 41, 42 to permit the desired slight rocking motion of the beam but introducing no friction, free play or back lash and requiring no lubrication or housing protection; and (2) the preferred connection of the Bourdon tubes to the lever arms 13a and 13b of the rocking beam 13.

The rocking beam 13 has a main transverse member 50 (see Fig. 6) which extends at right angles to the planes of the two Bourdon tubes, and it carries two lever arms 13a and 13b to which the tips of the Bourdon tubes are connected. This main member, while relatively massive in comparison with other parts, may be of aluminum and is made as large as is here indicated solely to secure absolute rigidity and to eliminate any material torsional deflection. Near one end is the short lever arm 13a to which the primary pressure tube 11 is connected by linkage 12, and near the other is the longer arm 13b to which the balancing tube is connected by linkage 18. The two arms are so spaced in order to locate them beneath the tips of their respective Bourdon tubes, and the main member 50 need be only as long as is needed to locate the lever arms in that relation to the tubes.

At one end of the beam is the stud 51 to which is fixed, by a split clamp 52, the main body 53 of the baffle arm 20. (See Fig. 9.) The baffle unit has an adjustable tip in the form of a spring hinge 54 secured to the main arm 53 and to the part 55 on which the baffle element proper 56 is mounted in register with the outlet of the leakage nozzle 21. The adjusting screw 57 on the main body of the arm bears on the hinged part 55 and enables the baffle element proper to be set at the desired spacing from the outlet.

The rocking beam is pivotally mounted by the spring bearing means shown best in Figures 6 and 7. The beam has at each end two flat spring pieces or straps, one vertical and the other horizontal, each of which is connected at one end to the rocking member 50 and at the other end to one of the upright posts of the base. Thus (as see Figure 7, which shows one such pair of spring bearing pieces) the horizontal spring piece 60 is fixed at one end by a machine screw and pad 61 to the top surface of post 42, and at the other end by a screw and pad 62 to a leg 63 on the beam member 50; while the co-operating vertical spring piece 65 is similarly held at the bottom to a flat 66 on the side of the supporting post 42, and at the top to the side wall of a vertical channel 67 in the beam member. (Cf. Fig. 6.) At the other end of the beam member 50 are a similar pair of spring straps 70, 75 (see Fig. 6) secured in a like manner to the beam and to the other post 41. (Corresponding parts at that end are similarly numbered, followed by the letter $a$.)

Each pair of angularly displaced spring pieces form a pivotal axis 14 where the planes of the two straps intersect. Each spring piece is free to flex or pivot about its points of connection to the beam and the base, while serving to support the beam against any but rocking motion.

While not uniquely useful in this instrument, this form of spring bearing (novel so far as I am aware) is of especial utility and advantage in supporting a rocking member such as the beam 13 which is subject to small forces causing almost imperceptible motion but requiring extreme sensitivity of response to its impelling forces.

The manner of connecting the tips of the Bourdon tubes to the lever arms of the rocking beam 13 is best seen in Figures 7, 8 and 9. Each tip is held against horizontal motion, either inward or outward, by stay members 80, 81 which are secured at their inner ends to a fixed transverse member 83 mounted on uprights 84, 85 at the top of the bearing posts 41, 42. These stays lie in the plane of the tips of the tubes and are firmly attached to the tips by screw pins 86, 87. The stays lie flat in a horizontal plane and therefore flex enough to offer no material resistance to the vertical component of the force exerted by the tubes. In consequence, the horizontal component of the force exerted by the tubes is restrained, and only the vertical component is effectively applied to the rocking beam 13.

The linkages 12, 18 connecting the tubes to the lever arms 13a and 13b consist of short lengths of light music wire which are silver soldered at their ends in members attached to the Bourdon tube tips and to the lever arms. This wire is amply strong and is sufficiently flexible so that tight connections may be made at its ends without any provision for pivoting at the joints, thus eliminating slack. These links are always under tension when the instrument is in use.

Considering in detail, as an illustration, the connection to the longer arm 13b as shown in Figures 7 and 9, the piece of music wire 90 is held at the top in a member 91 which is held to the tube tip by the same screw pin 86 that holds the horizontal stay 80, giving a tight joint with no slack or free play. At its lower end the wire 90 is soldered in a threaded piece 92 extending through a member 93 which is horizontally adjustable in the end of the lever arm 13b and is held in position by clamping screws 95. This permits adjustment of the length of the lever arm 13b through which the output force of the tube is applied to the rocking beam. The threaded end piece 92, held in adjusted position by nuts 94, makes it possible to fix the initial tension on the wire 90.

The same type of wire linkage is used to connect the tip of the primary tube 11 to the shorter lever arm 13 which rests in a channel in the underside of beam 50a and projects at the opposite side of its axis. This arm is adjustable horizontally, to alter the length of the lever arm, by means of a screw 96 bearing against a fixed stud 97.

To limit the permissive rocking of the beam 13 there is a post mounted on the base and having upper and lower pins 99 projecting across above and below the longer lever arm 13b.

This instrument operates in the manner already described. It illustrates the compactness which can be obtained in a working instrument employing restrained Bourdon tubes, also the lightness of the parts involved in the opposition of the mechanical forces resulting from the fluid pressures on the tubes, and the simplicity of the pivotal spring bearing with its freedom from friction and back-lash, and from any need of lubrication or housing.

In the foregoing, I have spoken of pressures and forces in terms of pounds. Pressures so expressed mean pressures per square inch and unless otherwise noted the illustrations given are gauge pressures, above atmospheric. Forces expressed in pounds mean actual applied forces, not per unit area.

No example has been given of the use of a restrained Bourdon tube with a sub-atmospheric primary pressure because the same principles apply. The sole source of difference is that the tip of the Bourdon tube exerts an inwardly directed force instead of an outward force. One choice of means should be noted in that connection, growing out of the desirability of still having the force applied through a tension link rather than a compression member as would be if, for example, the Bourdon tube were connected to a rocking beam in the identical manner used for superatmospheric pressure.

It is preferable in such case to employ a biasing spring to oppose the force of the primary tube over its full range of sub-atmospheric pressure, and to connect the Bourdon tube through a tension link pulling against the spring. The balancing force then opposes the differential of the constant spring force and the primary tube force. With no vacuum applied, the balancing force is at a maximum to oppose the full spring force; and as vacuum is applied to the primary tube, tending to unbalance the forces, the control nozzle must be arranged to open to lower the balancing force proportionately. The operation of the instrument is the same, but the calibration of the responsive instrument must be in terms of zero vacuum at maximum transmitted pressure. The zero vacuum may of course be indicated as a maximum pressure on a scale reading in terms of absolute pressure.

It is to be understood also that in speaking of a nozzle in relation to the leakage system of pressure control I do not limit myself to any particular construction of that leakage member but include any form of outlet the leakage from which is varied by the relative position of the baffle or flapper. The leakage system of control is not a part of this invention, but is a preferred form of control for an instrument embodying my improvements. Where it is used, as is known, there is a choice between having the nozzle fixed and coacting with a movable baffle, as shown here and preferred, or having the baffle fixed and coacting with a movable nozzle. I intend to include either form as equivalents within my claim.

I claim:

A fluid pressure transmitter having opposed fluid pressure elements subject respectively to a primary fluid pressure and a transmitting fluid pressure, a leakage nozzle unit the leakage from which is varied in response to unbalance of forces between said fluid pressure elements, a choked supply to said transmitting fluid pressure element, a second leakage nozzle for directly controlling the pressure of said fluid beyond the choke, and a substantially unrestrained Bourdon tube operated baffle for said second nozzle, the fluid pressure in said tube being controlled by said first nozzle, whereby a variation of leakage at the first nozzle is reflected in a greater variation at the second nozzle.

OSWALD C. BREWSTER.

References Cited in the file of this patent

UNITED STATES PATENTS

| Number | Name | Date |
| --- | --- | --- |
| 657,891 | Donnelley | Sept. 11, 1900 |
| 1,904,475 | Kissing | Apr. 18, 1933 |
| 2,068,663 | Diehl | Jan. 26, 1937 |
| 2,185,671 | Kimball | Jan. 2, 1940 |
| 2,212,085 | Tate | Aug. 20, 1940 |
| 2,264,262 | Erbguth | Nov. 25, 1941 |
| 2,272,256 | Vogt | Feb. 10, 1942 |
| 2,298,112 | Edwards | Oct. 6, 1942 |
| 2,354,423 | Rosenberger | July 25, 1944 |
| 2,356,970 | Brockett | Aug. 29, 1944 |
| 2,409,871 | Krogh | Oct. 22, 1946 |
| 2,431,200 | Rosenberger | Nov. 18, 1947 |
| 2,441,044 | Tate | May 4, 1948 |
| 2,512,561 | Ziegler | June 20, 1950 |

FOREIGN PATENTS

| Number | Country | Date |
| --- | --- | --- |
| 536,537 | Great Britain | May 19, 1941 |